(12) United States Patent
Kay et al.

(10) Patent No.: US 11,128,115 B2
(45) Date of Patent: Sep. 21, 2021

(54) APPARATUS AND METHOD FOR ARC FAULT DETECTION BASED ON SIGNAL-TO-NOISE RATIO

(71) Applicant: LEVITON MANUFACTURING CO., INC., Melville, NY (US)

(72) Inventors: Steven Kay, Middletown, RI (US); Yazhou Zhang, Manhasset, NY (US); Alan Neal, Fountain Hills, AZ (US); Ankit Sanghvi, Hicksville, NY (US); Michael Ostrovsky, Brooklyn, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 84 days.

(21) Appl. No.: 16/547,071

(22) Filed: Aug. 21, 2019

(65) Prior Publication Data
US 2021/0057900 A1    Feb. 25, 2021

(51) Int. Cl.
*H02H 3/00*    (2006.01)
*H02H 1/00*    (2006.01)
*H02H 3/44*    (2006.01)

(52) U.S. Cl.
CPC ............ *H02H 1/0015* (2013.01); *H02H 3/44* (2013.01)

(58) Field of Classification Search
None
See application file for complete search history.

(56) References Cited

U.S. PATENT DOCUMENTS

| | | | |
|---|---|---|---|
| 5,659,453 | A | 8/1997 | Russell et al. |
| 5,818,237 | A | 10/1998 | Zuercher et al. |
| 5,839,092 | A | 11/1998 | Erger et al. |
| 5,939,092 | A | 8/1999 | Roggiero et al. |
| 6,577,484 | B1 | 6/2003 | Macbeth et al. |
| 6,654,219 | B1 | 11/2003 | Romano et al. |
| 6,751,528 | B1 | 6/2004 | Dougherty |
| 7,062,388 | B2 | 6/2006 | Rivers, Jr. et al. |

(Continued)

OTHER PUBLICATIONS

UL 1699, "Standard for Safety, Arc-Fault Circuit-Interrupters." Illinois, U.S.A., May 3, 2017, pp. 1-42.

(Continued)

*Primary Examiner* — Stephen W Jackson
(74) *Attorney, Agent, or Firm* — Carter, DeLuca & Farrell LLP; George Likourezos

(57) ABSTRACT

The present disclosure relates to arc fault detection in an electrical switch apparatus. In aspects of the present disclosure, an arc fault electrical switch apparatus includes a conductive path, a switch configured to interrupt electrical current in the conductive path, a current sensor in electrical communication with the conductive path and configured to measure the electrical current to provide current measurements, and a controller. The controller is configured to execute instructions to sample the current measurements to provide current samples, computing an estimated signal-to-noise ratio of the electrical current based on at least a portion of the current samples, determine whether the signal-to-noise ratio is less than a predetermined threshold, and activate the switch to interrupt the electrical current in the conductive path, if the signal-to-noise ratio is less than the predetermined threshold.

22 Claims, 9 Drawing Sheets

(56) References Cited

U.S. PATENT DOCUMENTS

| | | |
|---|---|---|
| 7,110,864 B2 | 9/2006 | Restrepo et al. |
| 7,227,729 B2 | 6/2007 | Parker et al. |
| 7,307,820 B2 | 12/2007 | Henson et al. |
| 7,368,918 B2 | 5/2008 | Henson et al. |
| 7,441,173 B2 | 10/2008 | Restrepo et al. |
| 7,463,037 B2 | 12/2008 | Henson et al. |
| 7,492,163 B2 | 2/2009 | Restrepo et al. |
| 7,492,562 B2 | 2/2009 | Evans et al. |
| 7,864,492 B2 | 1/2011 | Restrepo et al. |
| 7,936,543 B2 | 5/2011 | Restrepo et al. |
| 8,023,235 B2 | 9/2011 | Bilac et al. |
| 8,184,011 B2 | 5/2012 | Nayak et al. |
| 8,373,570 B2 | 2/2013 | Restrepo et al. |
| 2004/0100274 A1 | 5/2004 | Gloster et al. |
| 2007/0208520 A1 | 9/2007 | Zhang et al. |
| 2009/0248329 A1 | 10/2009 | Restrepo |
| 2014/0226242 A1* | 8/2014 | Schripsema ............. H02H 3/08 361/63 |
| 2014/0354292 A1* | 12/2014 | Hiti ...................... G01R 31/005 324/503 |
| 2017/0117699 A1 | 4/2017 | Ostrovsky et al. |

OTHER PUBLICATIONS

Restrepo, Carlos E. "Arc Fault Detection and Discrimination Methods." Electrical Contacts, 2007 Proceedings of the 53rd IEEE Holm Conference on Electrical Contacts, IEEE, Sep. 2007, pp. 1-8.

Kay, Steven M., "Fundamentals of Statistical Signal Processing: Estimation Theory." Prentice Hall Signal Processing Series, 1993, pp. 83-233.

Kay, Steven M., "Fundamentals of Statistical Signal Processing, vol. II Detection Theory." Prentice Hall PTR, 1993 pp. 94-279.

* cited by examiner

APPARATUS AND METHOD FOR ARC FAULT DETECTION BASED ON SIGNAL-TO-NOISE RATIO

TECHNICAL FIELD

The present disclosure relates to electrical switches, and more particularly, to arc fault detection in an electrical switch apparatus.

BACKGROUND

Household appliances are typically connected to electrical receptacles having at least a hot terminal and neutral terminal, and the terminals are usually implemented as receptacles to which an electrical plug of the household appliance is attached. When an appliance operates, current is conveyed to the appliance through the terminals. An electrical arc can occur when electrical current flows outside of the terminals rather than through the terminals, and such a condition is commonly referred to as an arc fault. Some causes of arc faults include faulty connections due to corrosion or faulty installation.

Two types of arc faults include series arc faults and parallel arc faults. A series arc fault is an arc that occurs in series with the load and, thus, the arc has a current that is no greater than the load current. A parallel arc, in contrast, is an arc that occurs between any pairing of phase and neutral conductive paths, phase and ground conductive paths, or neutral and ground conductive paths. The current in a parallel arc can exceed the load current and can potentially be much greater than the load current. Both series and parallel arc faults can potentially cause ignition of surrounding combustible materials.

Commonly owned U.S. Patent Application Publication No. 2017/0117699, which is hereby incorporated herein by reference in its entirety, describes an arc fault circuit interrupter. Such a circuit interrupter is advantageous for many applications, and there is continuing interest in developing and improving arc fault detection.

SUMMARY

The present disclosure relates to arc fault detection in an electrical switch apparatus. One aspect of the present disclosure is directed to detecting arc faults based on signal-to-noise ratio of electric current conveyed through the electrical switch apparatus.

In accordance with one aspect of the present disclosure, an arc fault electrical switch apparatus includes a conductive path, a switch configured to interrupt the electrical current in the conductive path, a current sensor in electrical communication with the conductive path and configured to measure the electrical current to provide current measurements, and a controller. The controller is configured to execute instructions to sample the current measurements to provide current samples, computing an estimated signal-to-noise ratio of the electrical current based on at least a portion of the current samples, determine whether the signal-to-noise ratio is less than a predetermined threshold, and activate the switch to interrupt the electrical current in the conductive path, if the signal-to-noise ratio is less than the predetermined threshold.

In various embodiments of the apparatus, in computing the estimated signal-to-noise ratio of the electrical current, the controller is configured to execute the instructions to determine a plurality of signal-to-noise ratio values, where each signal-to-noise ratio value is based on a subset of the current samples, and select a maximum among the plurality of signal-to-noise ratio values as the signal-to-noise ratio. In various embodiments of the apparatus, the subsets of the current samples correspond to sliding a window over the current samples.

In various embodiments of the apparatus, the controller is further configured to execute the instructions to determine an estimated fundamental frequency value for the electrical current based on a portion of the current samples.

In various embodiments of the apparatus, in determining the estimated fundamental frequency value for the electrical current, the controller is configured to execute the instructions to identify the fundamental frequency value within a frequency range by iteratively narrowing the frequency range.

In various embodiments of the apparatus, in identifying the fundamental frequency value, the controller is configured to execute the instructions to, for each iteration: divide the frequency band for that iteration into a first sub-band having a first bandwidth and a second sub-band having a second bandwidth, wherein the first bandwidth and the second bandwidth satisfy a Golden ratio, and a frequency that divides the first sub-band and the second sub-band is denoted as $F_b$, select a larger one of the first sub-band or the second sub-band, select a frequency $F_d$ in the selected sub-band based on the Golden ratio, and narrow one end of the frequency band to one of the frequency $F_b$ or the frequency $F_d$.

In various embodiments of the apparatus, in computing the estimated signal-to-noise ratio of the electrical current, the controller is configured to execute the instructions to compute an estimated signal component of the current samples based on a specific set of harmonics for the signal component and based on a noise component of the current samples being additive white Gaussian noise.

In various embodiments of the apparatus, the specific set of harmonics for the signal component includes odd harmonics and excludes even harmonics.

In various embodiments of the apparatus, the estimated signal component is:

$$s = H(H^T H)^{-1} H^T x,$$

where:

$x = [x[0]\ x[1]\ \ldots\ x[N-1]]^T$ is a vector of the current samples, $$H = \begin{bmatrix} \cos\left(2\pi \frac{F_0}{F_s}(0)\right) & \ldots & \cos\left(2\pi p \frac{F_0}{F_s}(0)\right) & \sin\left(2\pi \frac{F_0}{F_s}(0)\right) & \ldots & \sin\left(2\pi p \frac{F_0}{F_s}(0)\right) \\ \vdots & \ddots & \vdots & \vdots & \ddots & \vdots \\ \cos\left(2\pi \frac{F_0}{F_s}(N-1)\right) & \ldots & \cos\left(2\pi p \frac{F_0}{F_s}(N-1)\right) & \sin\left(2\pi \frac{F_0}{F_s}(N-1)\right) & \ldots & \sin\left(2\pi p \frac{F_0}{F_s}(N-1)\right) \end{bmatrix},$$

F₀ is an estimated fundamental frequency of the electrical current,

F_s is a sampling rate of the current samples, and p is a total number of harmonics in the specific set of harmonics.

In various embodiments of the apparatus, $(H^T H)^{-1}$ is approximated as $$\frac{2}{N}.$$

In various embodiments, the noise component of the current samples is x−s.

In accordance with aspects of the present disclosure, a method of operating an arc fault electrical switch includes sampling electrical current to provide current samples, computing an estimated signal-to-noise ratio of the electrical current based on the current samples, determining whether the signal-to-noise ratio is less than a predetermined threshold, and activating a switch to interrupt the electrical current in the conductive path, if the signal-to-noise ratio is less than the predetermined threshold.

In various embodiments of the method, computing the estimated signal-to-noise ratio of the electrical current includes determining a plurality of signal-to-noise ratio values, wherein each signal-to-noise ratio value is based on a subset of the current samples, and selecting a maximum among the plurality of signal-to-noise ratio values as the signal-to-noise ratio. In various embodiments of the method, the subsets of the current samples correspond to sliding a window over the current samples.

In various embodiments of the method, the method includes determining an estimated fundamental frequency value for the electrical current based on a portion of the current samples.

In various embodiments of the method, determining the estimated fundamental frequency value for the electrical current includes identifying the fundamental frequency value within a frequency range by iteratively narrowing the frequency range.

In various embodiments of the method, identifying the fundamental frequency value includes, for each iteration: dividing the frequency band for that iteration into a first sub-band having a first bandwidth and a second sub-band having a second bandwidth, wherein the first bandwidth and the second bandwidth satisfy a Golden ratio, and a frequency that divides the first sub-band and the second sub-band is denoted as $F_b$, selecting a larger one of the first sub-band or the second sub-band, selecting a frequency $F_d$ in the selected sub-band based on the Golden ratio, and narrowing one end of the frequency band to one of the frequency $F_b$ or the frequency $F_d$.

In various embodiments of the method, computing the estimated signal-to-noise ratio of the electrical current includes computing an estimated signal component of the current samples based on a specific set of harmonics for the signal component and based on a noise component of the current samples being additive white Gaussian noise.

In various embodiments of the method, the specific set of harmonics for the signal component include odd harmonics and excludes even harmonics.

In various embodiments of the method, the estimated signal component is:

$$s = H(H^T H)^{-1} H^T x,$$

where:

$x = [x[0] \ x[1] \ \ldots \ x[N-1]]^T$ is a vector of the current samples, $$H = \begin{bmatrix} \cos\left(2\pi\frac{F_0}{F_s}(0)\right) & \ldots & \cos\left(2\pi p\frac{F_0}{F_s}(0)\right) & \sin\left(2\pi\frac{F_0}{F_s}(0)\right) & \ldots & \sin\left(2\pi p\frac{F_0}{F_s}(0)\right) \\ \vdots & \ddots & \vdots & \vdots & \ddots & \vdots \\ \cos\left(2\pi\frac{F_0}{F_s}(N-1)\right) & \ldots & \cos\left(2\pi p\frac{F_0}{F_s}(N-1)\right) & \sin\left(2\pi\frac{F_0}{F_s}(N-1)\right) & \ldots & \sin\left(2\pi p\frac{F_0}{F_s}(N-1)\right) \end{bmatrix},$$

F₀ is an estimated fundamental frequency of the electrical current,

F_s is a sampling rate of the current samples, and p is a total number of harmonics in the specific set of harmonics.

In various embodiments of the method, $(H^T H)^{-1}$ is approximated as $$\frac{2}{N}.$$

In various embodiments of the method, the noise component of the current samples is x−s.

Further details and aspects of exemplary embodiments of the present disclosure are described in more detail below with reference to the appended figures.

DETAILED DESCRIPTION

The present disclosure relates to arc fault detection in an electrical switch apparatus. One aspect of the present disclosure is directed to detecting arc faults based on signal-to-noise ratio of electric current conveyed through the electrical switch apparatus. In various embodiments, an electrical switch apparatus as disclosed herein can be located in an electrical receptacle, in an electrical panel, or in other electrical systems.

Figure 1:
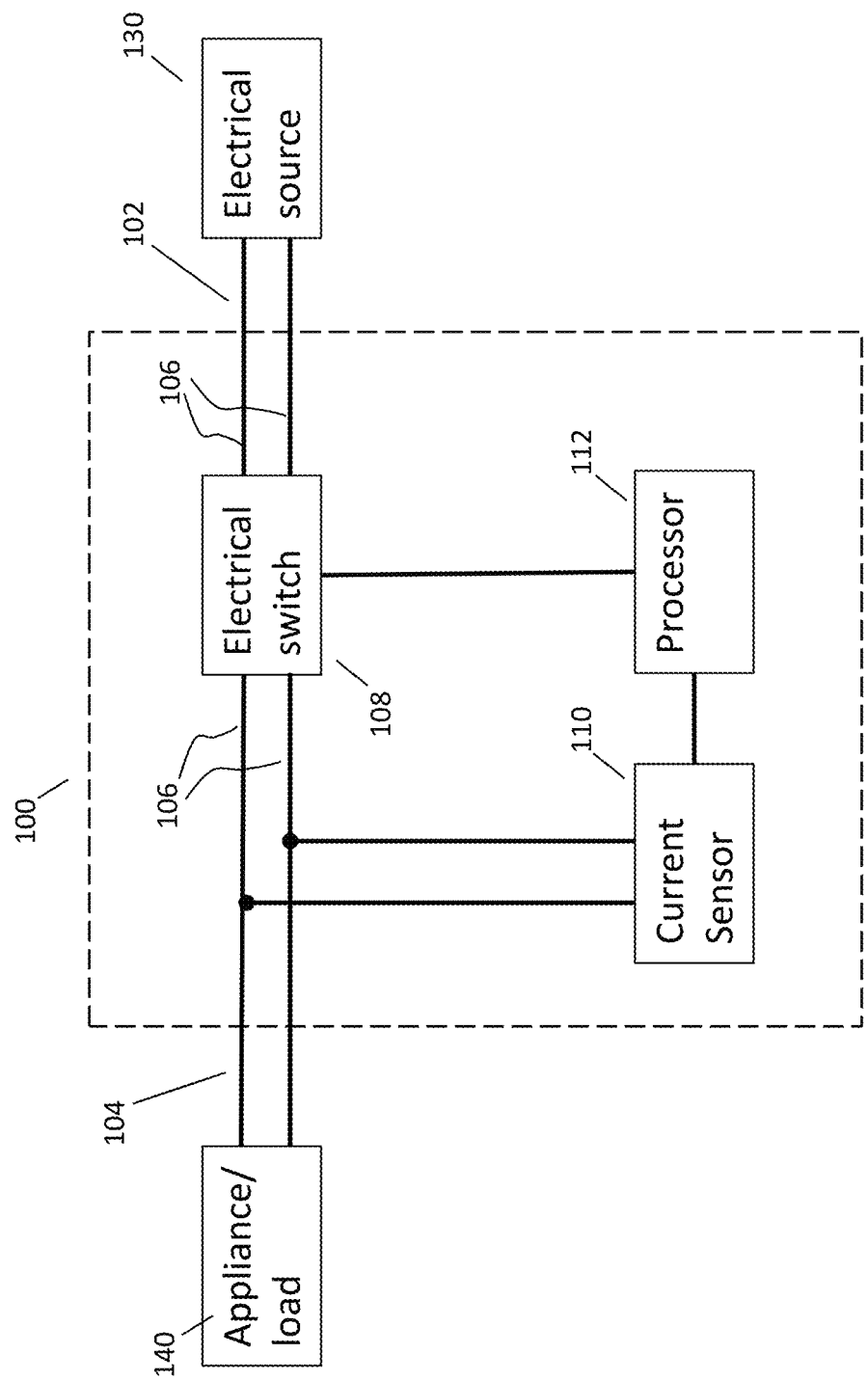
FIG. 1 is a diagram of an exemplary electrical switch apparatus, in accordance with aspects of the present disclosure.

FIG. 1 is a diagram of an exemplary electrical switch apparatus 100 in accordance with aspects of the present disclosure. The switch apparatus 100 includes a connection 102 to an electrical source 130, a connection 104 to an appliance or a load 140, conductors 106 for conveying current between the electrical source 130 and the appliance or load 140, and an electrical switch 108 in the conductive path. The connection 102 to the electrical source 130 and the connection 104 to the appliance or load 140 are illustrated as direct connections. However, in various embodiments, the connections 102, 104 need not be direct connections and can include intermediate connections. For example, when the switch apparatus 100 is located in an electrical receptacle, the connection 102 to the electrical source 130 can couple through an electrical panel. When the switch apparatus 100 is located in an electrical panel, the connection 104 to the appliance or load 140 can couple through an electrical receptacle. The conductors 106 include at least a hot conductor and a neutral conductor and, in various embodiments, can include a ground conductor. The illustration of FIG. 1 is exemplary, and other configurations are contemplated to be within the scope of the present disclosure.

The electrical switch 108 is located in the conductive path and is configured to interrupt current flowing through the conductive path when the switch 108 is activated/triggered or "tripped." When the electrical switch 108 is not activated/triggered, current is permitted to flow from the electrical source 130 to the appliance or load 140. When the electrical switch 108 is activated/triggered, the switch 108 interrupts the current flow and inhibits current from flowing to the appliance or load 140. An embodiment of an interrupter is described in U.S. Patent Application Publication No. 2017/0117699, which was incorporated by reference above. Other types or implementations of current interrupters are contemplated to be within the scope of the present disclosure for the electrical switch.

The electrical switch apparatus 100 includes a current sensor 110 that is in electrical communication with a load-side conductor 106 of the electrical switch 108. The current sensor 110 is configured to sense and measure the current flowing through at least one of the conductors 106. Persons skilled in the art will understand the various implementations of the current sensor. The current sensor 110 can measure the current to provide current measurements to the processor at various sampling rates $F_s$, such as, for example, $F_s$=3900 samples per second. Other sampling rates are within the scope of the present disclosure. The current sensor 110 is coupled to a processor 112, which samples the current measurements to generate current samples. In various embodiments, the current measurements provided by the current sensor 110 are digital signals and can include various numbers of bits. In various embodiments, the current measurements provided by the current sensor 110 are analog signals and can be converted into digital values by the processor 112. In various embodiments, the sampling of the current measurements from the current sensor 110 may be performed by sampling circuitry outside the processor 112. In such embodiments, the sampling circuitry (not shown) may provide the current samples to the processor 112 or to a memory, and the processor 112 can receive such current samples from the sampling circuitry or from the memory.

The processor 112 can be various types of computing devices, such as a microcontroller, a digital signal processor, a CPU, a GPU, a programmable logic device, an application specific integrated circuit, a field-programmable gate array, a combination of such computing devices, or another type of computing device. For example, the processor 112 can be implemented by a STM32F412 microcontroller provided by STMicroelectronics, or by an EFM32WG microcontroller provided by Silicon Labs. In various embodiments, the processor 112 can include an on-chip memory that stores instructions and data, such as firmware instructions. In various embodiments, the electrical switch apparatus 100 can include a separate memory (not shown), and the processor 112 can access instructions and/or data from the memory. In various embodiments, the electrical switch apparatus 100 can utilize direct memory access to enable current samples to be directly stored into a memory on the processor 112 or off the processor, and the processor 112 can access the current samples from the memory. Such configurations and other variations are contemplated to be within the scope of the present disclosure. The operations of the processor 112 will be described in more detail later herein. For now, it is sufficient to note that the processor 112 is configured to execute instructions to compute an estimated signal-to-noise ratio of the current conveyed through the conductor(s) 106. The processor 112 is coupled to the electrical switch 108 and, based on the estimated signal-to-noise ratio, the processor 112 can activate/trigger or not trigger the electrical switch 108.

Figure 2:
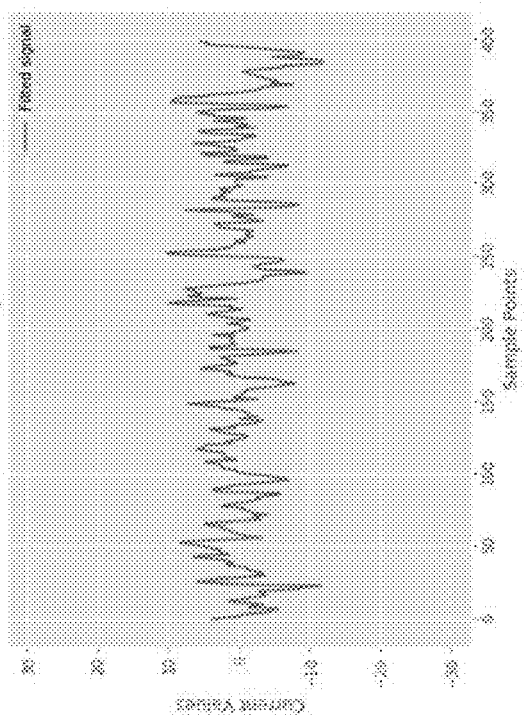
FIG. 2 is a diagram of an exemplary electrical current waveform and its various components, in accordance with aspects of the present disclosure.
Figure 2:
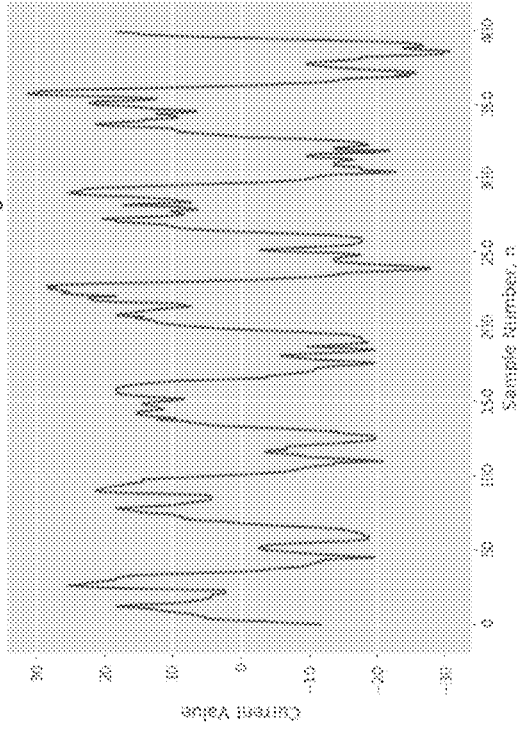
Figure 2:
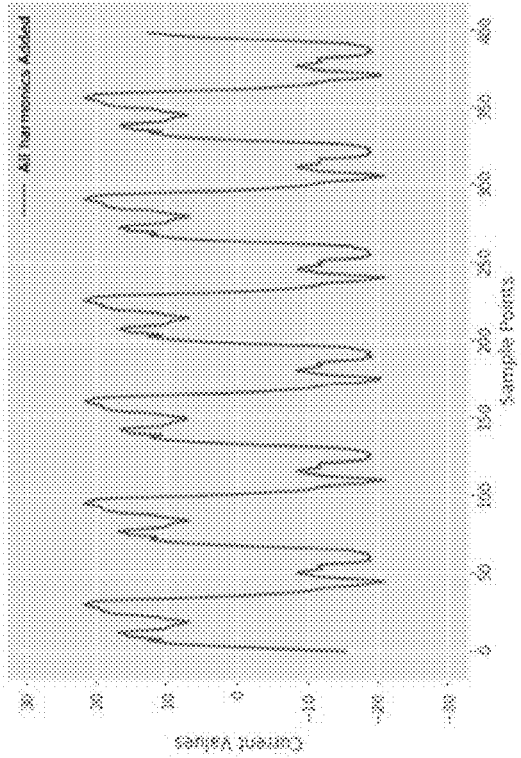
Figure 3:
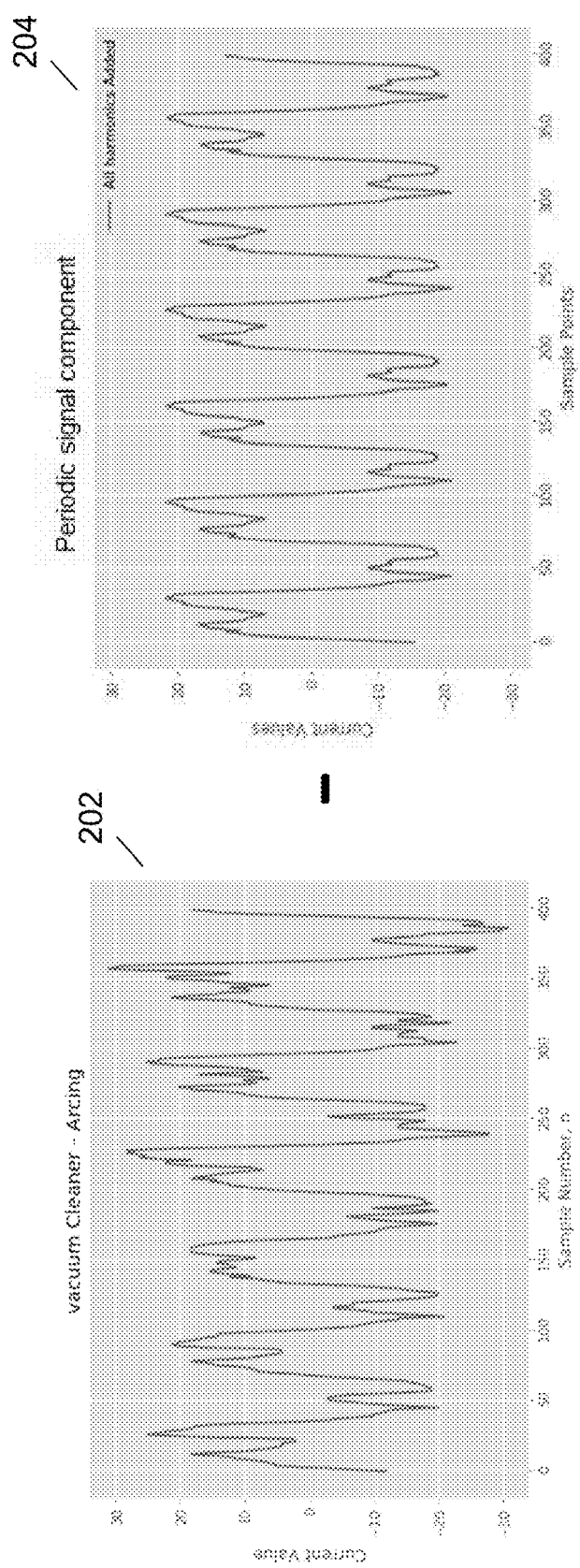
FIG. 3 is another diagram of an exemplary electrical current waveform and its various components, in accordance with aspects of the present disclosure.

Referring now to FIG. 2, aspects of signal-to-noise ratio will be described. FIG. 2 shows a diagram of an exemplary electrical current 202 detected by the current sensor 108 of FIG. 1 when arcing is occurring. The electrical current 202 can be viewed as having a signal component 204 and a random noise component 206. When the electrical current samples 202 are denoted in discrete-time as x[n], the signal component 204 is denoted in discrete-time as s[n], and the noise component 206 is denote in discrete-time as w[n], the relationship between them is expressed as x[n]=s[n]+w[n]. Between the signal component s[n] 204 and the noise component w[n] 206, the signal component 204 is more predictable because the fundamental frequency of electrical current from an electrical main will generally be about 50 Hz or 60 Hz in various regions of the world and because the noise component is usually random. Accordingly, in accordance with aspects of the present disclosure, the electrical switch apparatus operates to provide current samples x[n] 202, provide an estimate of the signal component s[n] 204, and compute the noise component 206 as w[n]=x[n]−s[n], as shown in FIG. 3.

Figure 4:
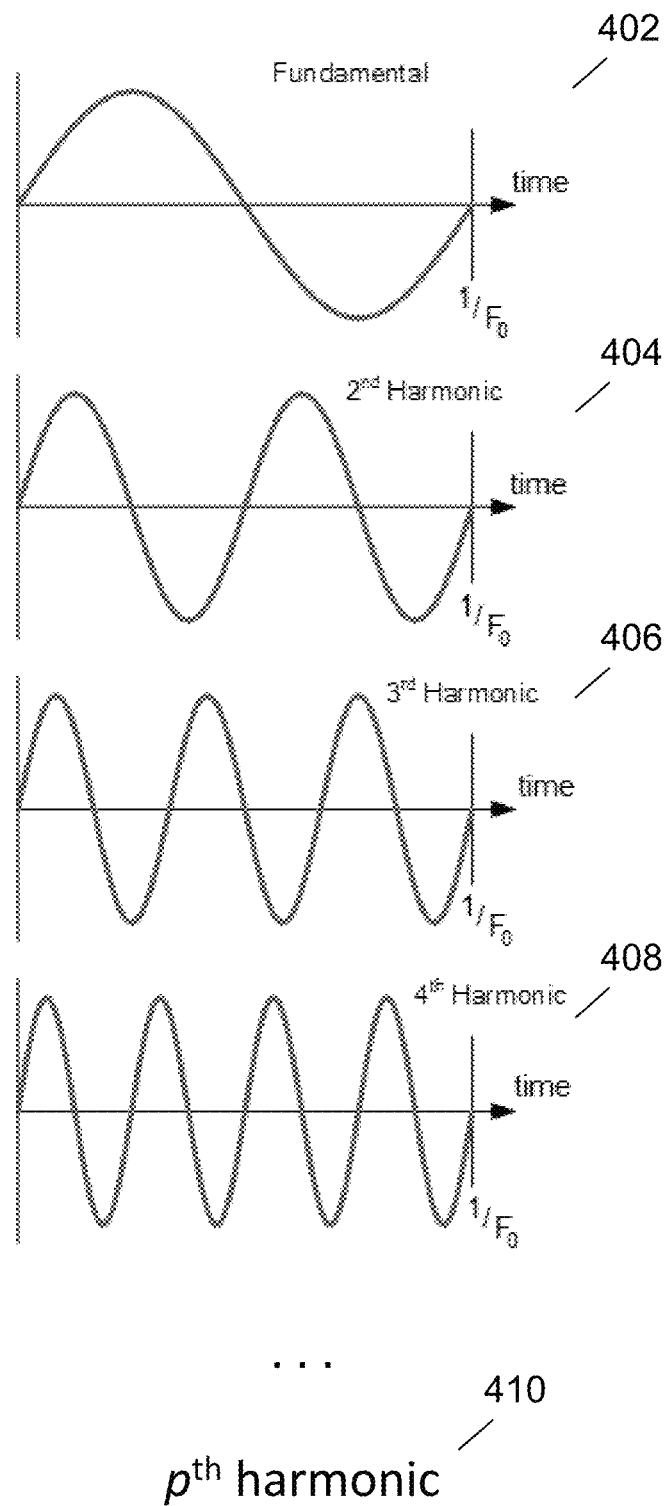
FIG. 4 is a diagram of an exemplary fundamental frequency and harmonics, in accordance with aspects of the present disclosure.

With reference to FIG. 4, a waveform can be represented by a combination of a fundamental frequency sub-component 402 and various harmonic frequency sub-components 404-410. In accordance with aspects of the present disclosure, the signal component 204 of FIG. 3 can be estimated using a predetermined number p of harmonics 402-410, where the number p counts the fundamental frequency 402 as a 1$^{st}$ harmonic. For a discrete-time signal that is generated by a sampling rate of $F_s$, and for a fundamental frequency denoted as $F_0$, the discrete-time signal component can be estimated as a Fourier series:

$$s[n] = \sum_{k=1}^{p} a_k \cos\left(2\pi k \frac{F_0}{F_s} n\right) + \sum_{k=1}^{p} b_k \sin\left(2\pi k \frac{F_0}{F_s} n\right). \quad \text{(Equation 1)}$$

The quantity $$\frac{F_0}{F_s}$$

may be referred to as a normalized fundamental frequency and is used when expressing a signal by sample number s[n] rather than by time (for example, s(n·$T_s$) for a sampling period $T_s$). The normalized fundamental frequency can be denoted as $f_0$. With respect to electrical current provided by an electrical main, the fundamental frequency $F_0$ of the electrical current will generally be about 50 Hz or 60 Hz in various regions of the world. For a fundamental frequency of $F_0$=60 and a sampling rate of $F_s$=3900, the normalized fundamental frequency becomes 60 cycles per 3900 samples, or 1 cycle of the fundamental frequency per 65 samples. Expressed another way, the period M of the normalized fundamental frequency is, in such example, M=65 samples, and is, in general, $$M = \frac{1}{f_0} = \frac{F_s}{F_0}$$

samples.

The signal component s[n] of equation 1 is an estimate of an actual signal component (204, FIG. 3) because only a number p of harmonics are included rather than all harmonics and because there is no DC offset. The estimate becomes more accurate as p increases, and the estimate becomes less accurate as p decreases. For a given sampling rate $F_s$, the maximum number of harmonics is ($F_s$/2)/$F_0$ when an antialiasing filter cuts off frequencies above $F_s$/2. In accordance with aspects of the present disclosure, the number of harmonics p to include in computing the estimated signal component can vary depending on the computational power available and the response time needed, among other factors. For example, using a STM32F412 microcontroller provided by STMicroelectronics, the number of harmonics used to estimate the signal component s[n] can be p=16 harmonics.

In equation 1, the values of $a_k$ and $b_k$ can be determined based on the current samples x[n]. For example, expressing each pair of $a_k$ and $b_k$ as a complex number $X_k$=$a_k$+j $b_k$, the value of $X_k$ can be computed by:

$$X_k = \sum_{n=0}^{M-1} x[n] e^{-j2\pi k \frac{F_0}{F_s} n} \quad \text{(Equation 2)}$$

where M is the period of the normalized fundamental frequency and, as mentioned above, is $$M = \frac{F_s}{F_0}$$

samples. Persons skilled in the art will understand various techniques for computing equation 2, and such techniques are contemplated to be within the scope of the present disclosure.

The values of $a_k$ and $b_k$ that are computed using equation 2 are then used in equation 1 to estimate the signal component s[n] for each sample n. Then, as mentioned above, the noise component is determined as w[n]=x[n]−s[n] for each sample n. The estimated signal-to-noise ratio (SNR) is then determined as:

$$SNR = \frac{\frac{1}{N}\sum_{n=0}^{N-1}(s[n])^2}{\frac{1}{N}\sum_{n=0}^{N-1}(w[n])^2} = \frac{\sum_{n=0}^{N-1}(s[n])^2}{\sum_{n=0}^{N-1}(w[n])^2} \quad \text{(Equation 3)}$$

In accordance with aspects of the present disclosure, and with reference again to FIG. 1, when the SNR is greater than or equal to a predetermined threshold, the processor 112 would not trigger the electrical switch 108. The processor 112 would activate/trigger the electrical switch 108, however, when the SNR is less than the predetermined threshold.

Figure 5:
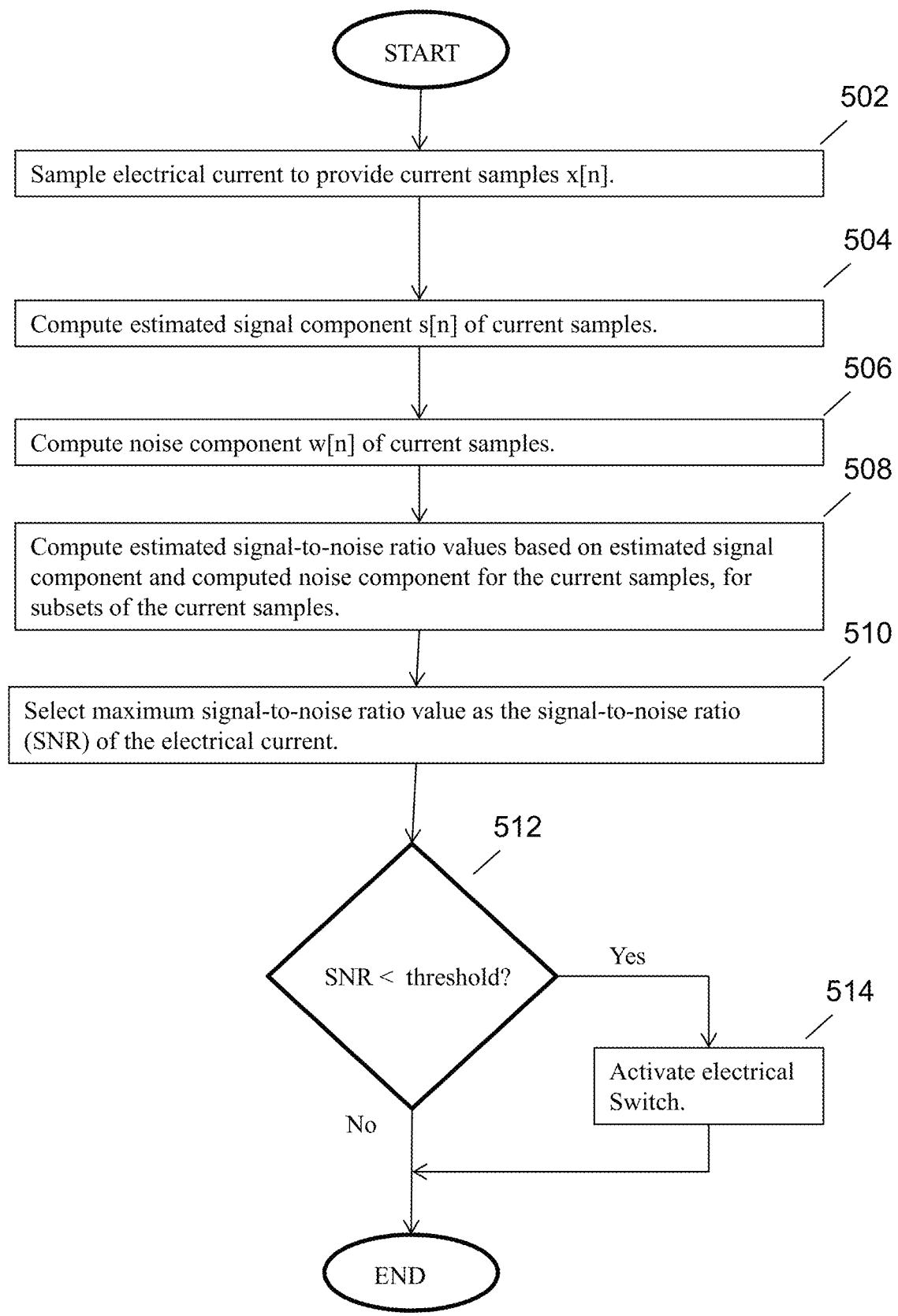
FIG. 5 is a flow chart of an exemplary operation for detecting arc faults, in accordance with aspects of the present disclosure.

FIG. 5 illustrates a flow diagram of the exemplary operation described above. At block 502, the operation samples electrical current to provide current samples x[n]. At block, 504, the operation estimates the signal component s[n] of the current samples. The estimation can be performed, for example, using equations 1 and 2 above. At block 506, the operation computes the noise component w[n] of the current samples. As described above, the noise component can be computed by w[n]=x[n]−s[n]. At block 508, the operation determines signal-to-noise ratio values based on the estimated signal component s[n] and the computed noise component w[n] for the current samples, for subsets of the current samples corresponding to applying a sliding window to the samples. For example, if there are 400 samples n=0, . . . , 399, the window can capture a subset of those samples (such as 3 periods of samples) for computing each signal-to-noise ratio value. In various embodiments, the window can "slide" one sample or more than one sample to provide another subset of samples. At block 510, the maximum of the signal-to-noise ratio values is selected as the signal-to-noise ratio (SNR) of the electrical current. At block 512, the operation compares the SNR to a predetermined threshold. If the SNR is less than the predetermined threshold, the operation proceeds to block 514 to activate/trigger the electrical switch. Otherwise, the operation ends.

The process of determining a value for the predetermined threshold will be described later herein. In short, the predetermined threshold can be determined empirically based on data on electrical current when there is arcing and data on electrical current when there is no arcing. As explained later herein, the predetermined threshold may not eliminate all false positives in detecting an arc fault. However, in most situations, the operation of FIG. 5 should result in an improvement and in reduced false positives. The operation of FIG. 5 is exemplary, and variations are contemplated to be within the scope of the present disclosure. For example, in various embodiments, the SNR of the electrical current can be estimated to be an average of the signal-to-noise ratio values corresponding to the sliding window. Other variations are contemplated.

Accordingly, described above are an apparatus and method for detecting arc faults in electrical switch assemblies. Persons skilled in the art will understand various techniques for computing equations 1-3 above, and such techniques are contemplated to be within the scope of the present disclosure. The following will describe a particular technique for computing an estimated signal-to-noise ratio of an electrical current, in accordance with aspects of the present disclosure.

Referring again to equation 1, the estimated signal component of the current samples that is shown in equation 1 can also be expressed as a matrix computation. When there are N current samples $x=[x[0] \ldots x[N-1]]^T$ and the signal component of the N samples is expressed as matrix $s=[s[0] \ldots s[N-1]]^T$, equation 1 can equivalently be expressed as the matrix computation $s=H\theta$, where $$H = \begin{bmatrix} \cos\left(2\pi\frac{F_0}{F_s}(0)\right) & \cdots & \cos\left(2\pi p\frac{F_0}{F_s}(0)\right) & \sin\left(2\pi\frac{F_0}{F_s}(0)\right) & \cdots & \sin\left(2\pi p\frac{F_0}{F_s}(0)\right) \\ \vdots & \ddots & \vdots & \vdots & \ddots & \vdots \\ \cos\left(2\pi\frac{F_0}{F_s}(N-1)\right) & \cdots & \cos\left(2\pi p\frac{F_0}{F_s}(N-1)\right) & \sin\left(2\pi\frac{F_0}{F_s}(N-1)\right) & \cdots & \sin\left(2\pi p\frac{F_0}{F_s}(N-1)\right) \end{bmatrix},$$

and $$\theta = [a_1 \ldots a_p b_1 \ldots b_p]^T.$$

As before, the values in the θ matrix are not known. In accordance with aspects of the present disclosure, the values in the θ matrix can be estimated based on treating the noise component as white Gaussian noise with each sample being independent of the others and having a normal distribution with zero mean and a variance of $\sigma^2$. In particular, the general approach is to maximize the probability density function of a white Gaussian noise random variable having a normal distribution. The maximum of the probability density function corresponds to the most likely noise component value. The operation finds the parameters that would maximize the probability density function to make the noise component values the most probable, based on a technique known as maximum likelihood estimation.

For example, for a noise component $w=[w[0] \ldots w[N-1]]^T$ having a normal distribution and zero mean, the probability density function for any given sample w[n] is:

$$\frac{1}{(2\pi\sigma^2)^{1/2}} e^{-\frac{1}{2\sigma^2}(w[n])^2}.$$

Based on the entire noise component $w=[w[0] \ldots w[N-1]]^T$ and maximum likelihood estimation, the likelihood function to maximize is:

$$\frac{1}{(2\pi\sigma^2)^{N/2}} e^{-\frac{1}{2\sigma^2}(w^T w)}.$$

The noise component can still be expressed as w=x−s. Because s=Hθ, the noise component is equivalently expressed as w=x−Hθ. Accordingly, the likelihood function becomes:

$$\frac{1}{(2\pi\sigma^2)^{N/2}} e^{-\frac{1}{2\sigma^2}(x-H\theta)^T(x-H\theta)}.$$

In the likelihood function, the parameters θ and $\sigma^2$ are unknown, and the task is to find the expressions for $\hat{\theta}$ and $\hat{\sigma}^2$ that would maximize the likelihood function.

In accordance with aspects of the present disclosure, and based on maximum likelihood estimation, the expressions for $\hat{\theta}$ and $\hat{\sigma}^2$ that would maximize the likelihood function are:

$$\hat{\theta} = (H^T H)^{-1} H^T x$$

$$\hat{\sigma}^2 = \frac{1}{N}(x - H\hat{\theta})^T (x - H\hat{\theta}).$$

The signal component of the current samples becomes:

$$\hat{s} = H\hat{\theta} = H(H^TH)^{-1}H^Tx \qquad \text{(Equation 4)}$$

where $$H = \begin{bmatrix} \cos\left(2\pi\frac{F_0}{F_s}(0)\right) & \cdots & \cos\left(2\pi p\frac{F_0}{F_s}(0)\right) & \sin\left(2\pi\frac{F_0}{F_s}(0)\right) & \cdots & \sin\left(2\pi p\frac{F_0}{F_s}(0)\right) \\ \vdots & \ddots & \vdots & \vdots & \ddots & \vdots \\ \cos\left(2\pi\frac{F_0}{F_s}(N-1)\right) & \cdots & \cos\left(2\pi p\frac{F_0}{F_s}(N-1)\right) & \sin\left(2\pi\frac{F_0}{F_s}(N-1)\right) & \cdots & \sin\left(2\pi p\frac{F_0}{F_s}(N-1)\right) \end{bmatrix},$$

Combining equation 3 and equation 4, the signal-to-noise ratio can be estimated as:

$$SNR = \frac{\frac{1}{N}(H\hat{\theta})^T(H\hat{\theta})}{\frac{1}{N}(x-H\hat{\theta})^T(x-H\hat{\theta})} = \frac{(H\hat{\theta})^T(H\hat{\theta})}{(x-H\hat{\theta})^T(x-H\hat{\theta})}. \qquad \text{(Equation 5)}$$

The expression of equation 5 can be used in the operation of FIG. 5 to estimate signal-to-noise ratio (SNR) of the electrical current. If the SNR is less than the predetermined threshold, this indicates the likely possibility of an arc fault, and the processor can activate/trigger the electrical switch to interrupt the current.

The following will describe various optimizations and approximations that reduce the computational demand of estimating signal-to-noise ratio. One or more of the following optimizations or approximation may be used when needed to reduce computation demand, but none of the following approximations or optimizations are necessary if computational power is sufficient for a particular application.

In accordance with aspects of the present disclosure, an approximation is as follows. The result of computing $H^TH$ is approximately $(N/2)I$, where I is the identity matrix, when the normalized fundamental frequency $$f_0 = \frac{F_0}{F_s}$$

is in the range $$\frac{2}{N} < f_0 < \left(\frac{1}{2} - \frac{2}{N}\right).$$

For example, in the case of N=400, fundamental frequency $F_0$=60, and sampling rate $F_s$=3900, the normalized fundamental frequency is about 0.015, which is in the above-noted range, so that $H^TH \approx (N/2)I$. In this case, $\hat{\theta}$ becomes:

$$\hat{\theta} = (H^TH)^{-1}H^Tx \approx \frac{2}{N}H^Tx. \qquad \text{(Equation 6)}$$

In accordance with aspects of the present disclosure, an optimization is as follows. With respect to signal power, the ratio of power of the current samples to power of the noise component can be expressed as:

$$\frac{\text{current sample power}}{\text{noise component power}} =$$

$$\frac{\text{signal component power} + \text{noise component power}}{\text{noise component power}} =$$

$$\frac{\text{signal component power}}{\text{noise component power}} + 1 = SNR + 1$$

Therefore:

$$SNR = \frac{\text{current sample power}}{\text{noise component power}} - 1 = \frac{x^Tx}{(x-H\hat{\theta})^T(x-H\hat{\theta})} - 1.$$

Combining this expression with equation 6 provides:

$$SNR = \frac{x^Tx}{\left(x - \frac{2}{N}HH^Tx\right)^T\left(x - \frac{2}{N}HH^Tx\right)} - 1 \qquad \text{(Equation 7)}$$

The expression of equation 7 can be used in the operation of FIG. 5 to estimate signal-to-noise ratio (SNR) of the electrical current. If the SNR is less than the predetermined threshold, this indicates the likely possibility of an arc fault, and the processor can activate/trigger the electrical switch to interrupt the current.

In accordance with aspects of the present disclosure, an optimization and/or approximation is as follows. When a signal waveform has half-wave symmetry, it satisfies the following constraint: s(t)=−s(t−T/2). For a waveform that has half-wave symmetry, all even harmonics are zero, and in that case, the H matrix in any of the descriptions above can be reduced in size by eliminating the columns corresponding to even harmonics. In particular, the H matrix can be reduced in size from a (N×2p) size down to a (N×p) size. In accordance with aspects of the present disclosure, the half-wave symmetry property can be applied to any of the H matrices or equations described above to reduce computational demand.

In accordance with aspects of the present disclosure, an optimization and/or approximation is as follows. The H matrix described above herein includes many terms having similar argument values. In particular, H is $$\begin{bmatrix} \cos\left(2\pi\frac{F_0}{F_s}(0)\right) & \cdots & \cos\left(2\pi p\frac{F_0}{F_s}(0)\right) & \sin\left(2\pi\frac{F_0}{F_s}(0)\right) & \cdots & \sin\left(2\pi p\frac{F_0}{F_s}(0)\right) \\ \vdots & \ddots & \vdots & \vdots & \ddots & \vdots \\ \cos\left(2\pi\frac{F_0}{F_s}(N-1)\right) & \cdots & \cos\left(2\pi p\frac{F_0}{F_s}(N-1)\right) & \sin\left(2\pi\frac{F_0}{F_s}(N-1)\right) & \cdots & \sin\left(2\pi p\frac{F_0}{F_s}(N-1)\right) \end{bmatrix}.$$

In various embodiments, certain argument values and/or sine or cosine computations in the H matrix can be interpolated using linear interpolation and/or retrieved from a look-up table, instead of being computed.

In accordance with aspects of the present disclosure, another optimization and/or approximation is as follows. As mentioned above, the fundamental frequency of electrical current from an electrical main will generally be about 50 Hz or 60 Hz in various regions of the world. The fundamental frequency may not be exactly 50 Hz or 60 Hz, however. Based on maximum likelihood estimation, the fundamental frequency of the electrical current and/or of the signal component of the electrical current can be estimate to be the fundamental frequency that minimizes the expression:

$$J(F_0) = -x^T H H^T x \qquad \text{(Equation 8)}$$

where H is defined above herein and it is assumed that $H^T H \approx (N/2)I$.

In accordance with aspects of the present disclosure, the search for the fundamental frequency that minimizes equation 8 can be limited to a predetermined range of frequencies, such as 49 Hz-51 Hz, or 59 Hz-61 Hz, or another range of frequencies. Additionally, the predetermined range can be searched in predetermined increments, such as 0.01 Hz increments, or another increment. The following description refers to FIGS. 6-8, which are not intended to be perfectly drawn to scale.

Figure 6:
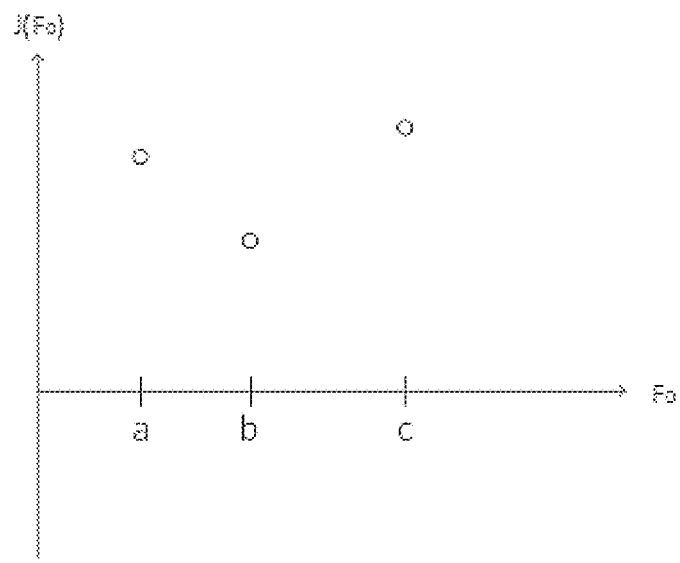
FIG. 6 is a chart of one iteration of an exemplary operation for determining an estimated fundamental frequency of electrical current, in accordance with aspects of the present disclosure.

In various embodiments, rather than searching every frequency increment in the frequency range, an iterative narrowing process can be applied to the frequency range to hone in on the fundamental frequency, in the case that equation 8 has one absolute minimum and no other local minimum. Referring to FIG. 6, the expression $J(F_0)$ can be evaluated at three points $F_0=a$, $F_0=b$ and $F_0=c$. For example, a could be 59 Hz, and c could be 61 Hz. The frequency b is selected such that the ratio of the distance c–b to the distance b–a satisfies the Golden ratio, which is $$\frac{1+\sqrt{5}}{2}.$$

In other words, the frequency band between a and c is split into two sub-bands where the bandwidths of the two sub-bands satisfy the Golden ratio.

As shown in FIG. 6, J(b)<J(a) and J(b)<J(c). Because J is unimodal, J must have a minimum value somewhere between $F_0=a$ and $F_0=c$. The operation selects a new point $F_0=d$ in the larger sub-band among [a, b] and [b, c]. In the illustrated case, [b, c] is chosen. The intermediate frequency d is selected such that the sub-band bandwidths [b, d] and [d, c] satisfy the Golden ratio as closely as possible, given the frequency increments utilized for the search.

Figure 7:
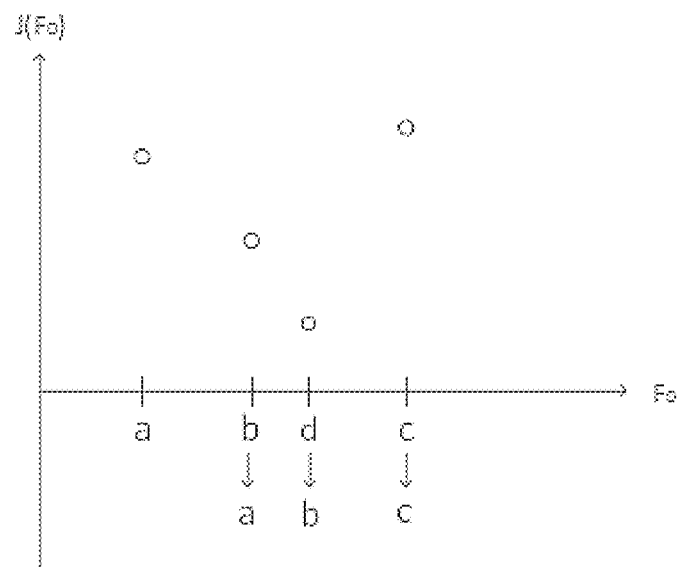
FIG. 7 is another chart of an iteration of an exemplary operation for determining an estimated fundamental frequency of electrical current, in accordance with aspects of the present disclosure.
Figure 8:
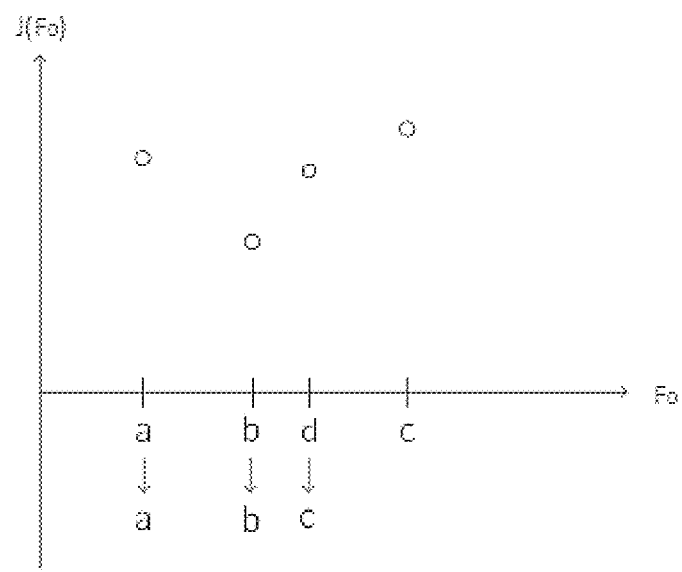
FIG. 8 is another chart of an iteration of an exemplary operation for determining an estimated fundamental frequency of electrical current, in accordance with aspects of the present disclosure.

The operation evaluates J(d) and compares it to J(b), with two possible outcomes: J(d)>J(b), or J(d)≤J(b). If J(d)≤J(b), as shown in FIG. 7, then the operation replaces b by a and replaces d by b, and iterates again. Otherwise, if J(d)>J(b), as shown in FIG. 8, then the operation replaces d by c, and iterates again. In both cases, the interval [a, c] is iteratively narrowed to hone in on the minimum value. In various embodiments, the iterations can end when the length of the interval |c−a| is the predetermined frequency increment for the search. For example, if the frequency increment for the search is 0.01 Hz, the iterations can end when |c−a| is 0.01.

Figure 9:
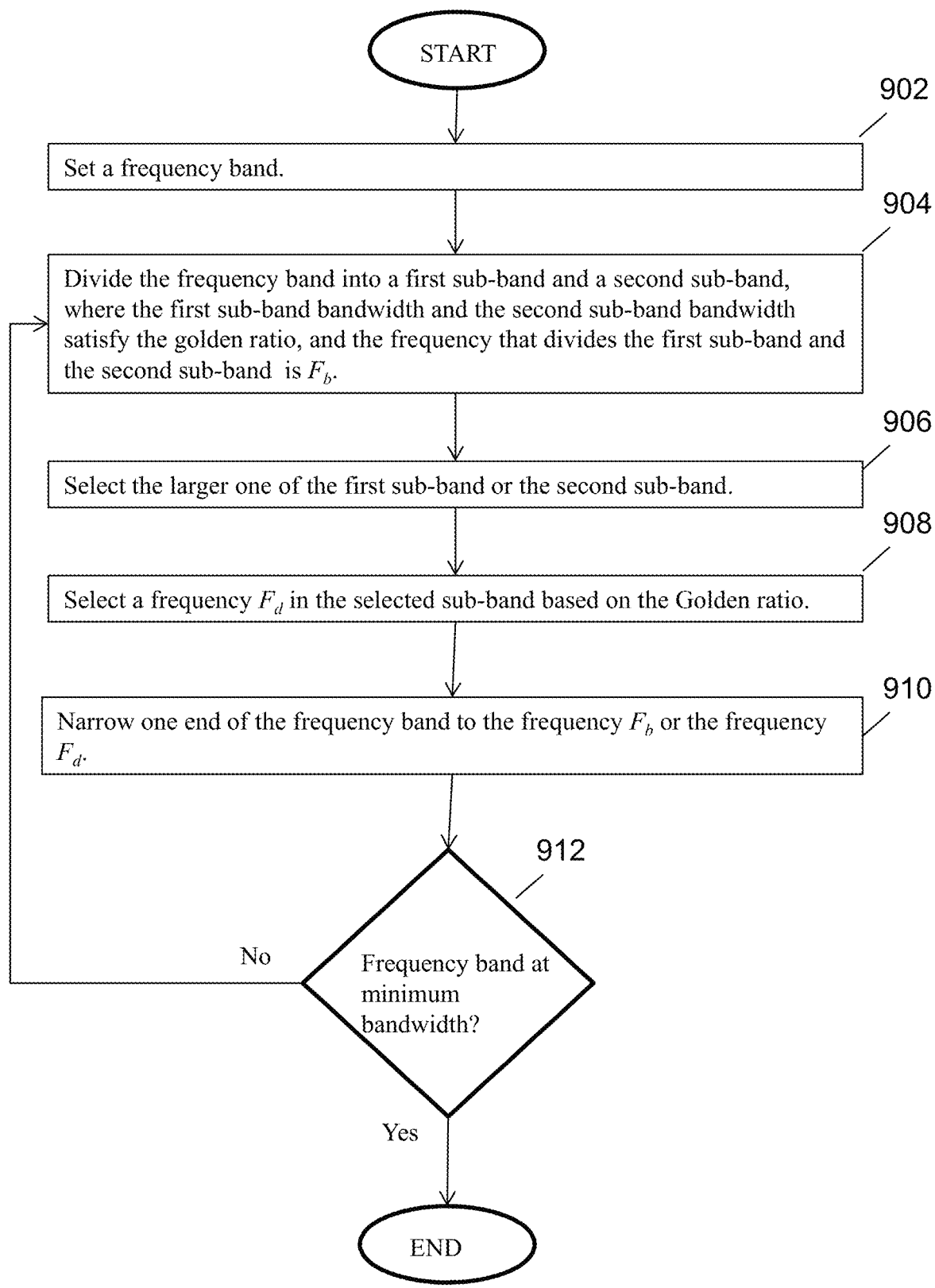
FIG. 9 is a flow chart of an exemplary operation for determining an estimated fundamental frequency of electrical current, in accordance with aspects of the present disclosure.

FIG. 9 is a flow diagram of the operation of determining an estimated fundamental frequency of the electric current. At block 902, the operation sets a frequency band, which can be a predetermined frequency band. For example, the frequency band can be 49 Hz-51 Hz, or 59 Hz-61 Hz. At block 904, the operation divides the frequency band into a first sub-band and a second sub-band, where the first sub-band bandwidth and the second sub-band bandwidth satisfy the Golden ratio. The frequency that divides the first sub-band and the second sub-band is denoted as $F_b$. At block 906, the operation selects the larger one of the first sub-band or the second sub-band. At block 908, the operation selects a frequency $F_d$ in the selected sub-band based on the Golden ratio. In various embodiments, the frequency $F_d$ can be set to the frequency increment that would be closest to satisfying the Golden ratio. At block 910, the operation narrows one end of the frequency band to the frequency $F_b$ or the frequency $F_d$. At block 912, the operation determines whether the frequency band has a minimum bandwidth. For example, if the search operation utilizes frequency increments of 0.01 Hz, a frequency band of 0.01 Hz would have the minimum bandwidth. If the frequency band does not have the minimum bandwidth, the operation iterates again with the reduced frequency band. Otherwise, the operation ends. The operation of FIG. 9 estimates the fundamental frequency of the electrical current or the signal component of the electrical signal. This fundamental frequency $F_0$ can then be used in the equations for computing the estimated signal-to-noise ratio of the electrical current. The operation of FIG. 9 is exemplary, and variations are contemplated to be within the scope of the present disclosure. For example, in various embodiments, the selection of various frequencies need not satisfy the Golden ratio. Other variations are contemplated.

Figure 10:
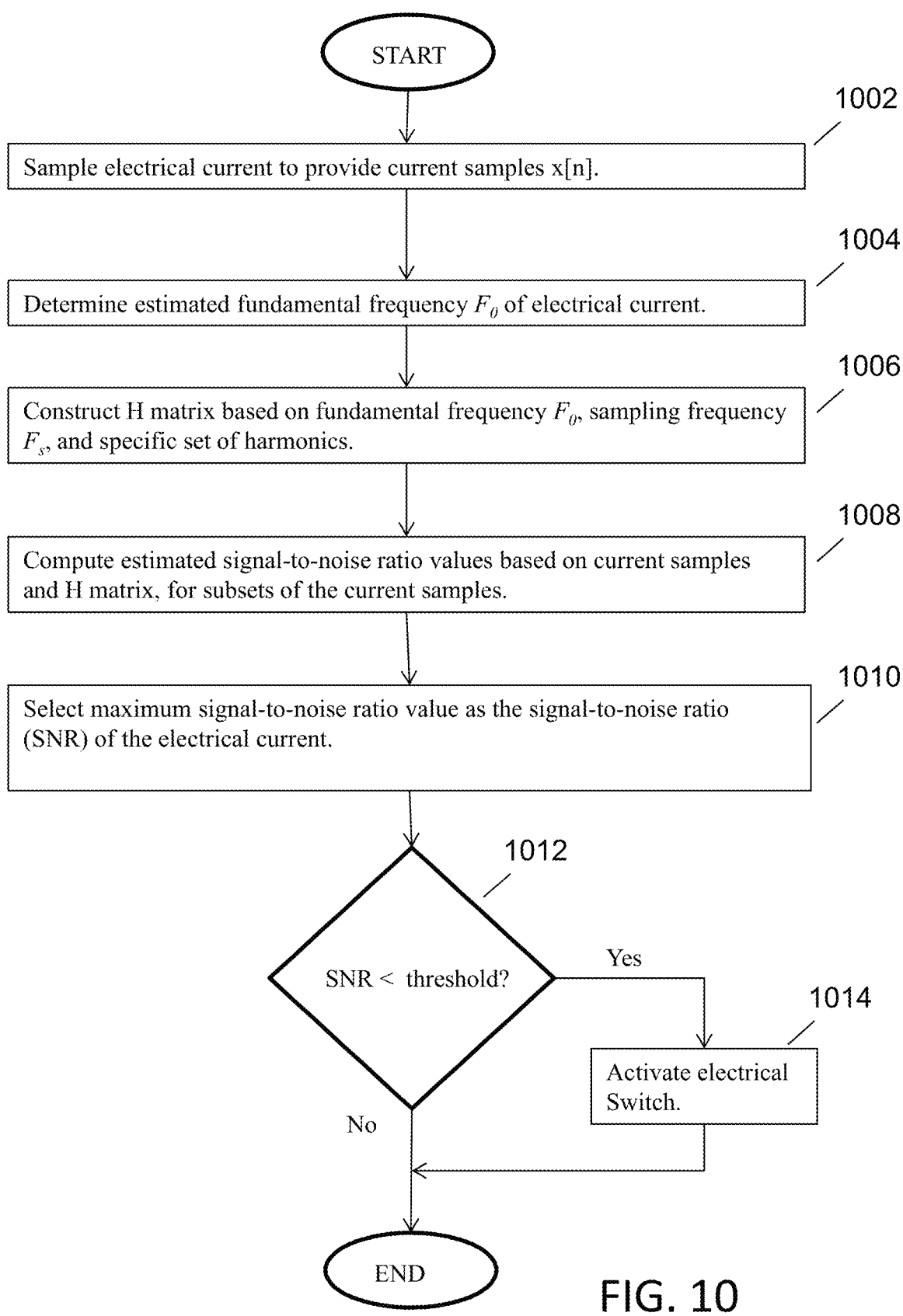
FIG. 10 is a flow chart of an exemplary operation for detecting an arc fault, in accordance with aspects of the present disclosure.

FIG. 10 provides a flow chart of an exemplary operation based on certain of the optimizations and approximations described above. At block 1002, the operation samples electrical current to provide current samples x[n]. At block 1004, the operation determines the estimated fundamental frequency $F_0$ of electrical current. The estimate can be based on the operation of FIG. 9, for example. At block 1006, the operation constructs the H matrix based on the fundamental frequency $F_0$, the sampling frequency $F_s$, and a specific set of harmonics. The H matrix can be computed with various approximations or optimizations, including lookup table, linear interpolation, and/or half-wave symmetry computational reductions. At block 1008, the operation determines signal-to-noise ratio values based on the current samples x[n] and the H matrix, for subsets of the current samples. At block 1010, the maximum of the signal-to-noise ratio values is selected as the signal-to-noise ratio (SNR) of the electrical current. At block 1012, the operation compares the SNR to a predetermined threshold. If the SNR is less than the predetermined threshold, the operation proceeds to block 1014 to activate/trigger the electrical switch. Otherwise, the operation ends. The operation of FIG. 10 is exemplary, and variations are contemplated to be within the scope of the present disclosure. For example, in various embodiments, the SNR of the electrical current can be estimated to be an average of the signal-to-noise ratio values corresponding to the sliding window. Other variations are contemplated.

Figure 11:
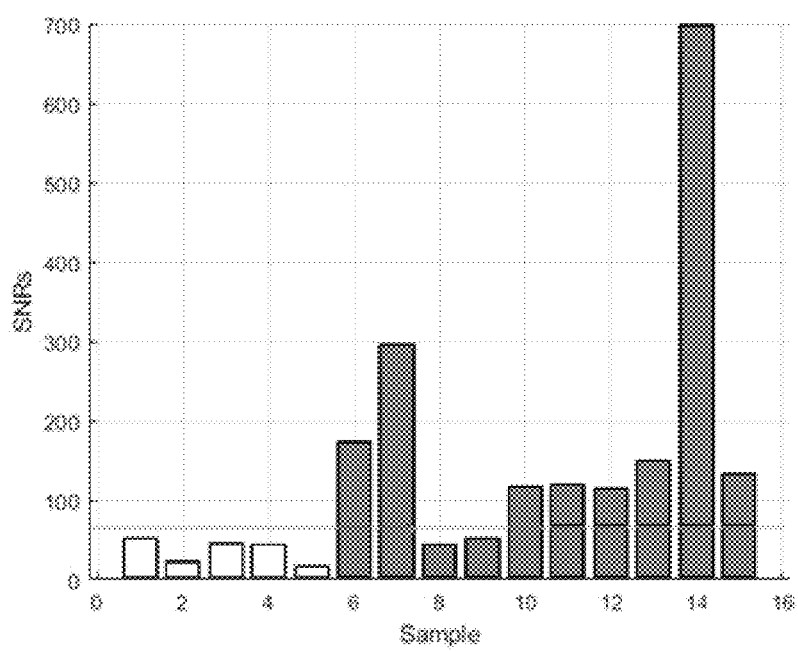
FIG. 11 is a chart of exemplary signal-to-noise ratios for various electrical current.

As mentioned above, the predetermined threshold in FIGS. 5 and 10 can be determined empirically based on data on electrical current when there is arcing and data on electrical current when there is no arcing. Referring to FIG. 11, there is shown a chart of computed signal-to-noise ratios for various sample scenarios. Sample scenarios 1-5 reflect arcing and sample scenarios 6-15 reflect no arcing. Using such a chart, the predetermined threshold for the SNR can be empirically set to reduce the probability of false positives in detecting arc faults. As shown in FIG. 11, sample scenarios 8 and 9 would still result in false positives, and it may not be possible to eliminate all false positives for certain scenarios.

Accordingly, described above are apparatuses and methods for detecting arc faults in electrical switch assemblies. Referring again to FIG. 1, the various data disclosed above may be stored in on-chip memory in the processor or in a separate memory (not shown). For example, the lookup table and the H matrix described above, among other data, can be stored in the memory. The processor can operate to perform the processing described above, including the operations of the various equations and the operations of FIGS. 5, 9, and 10. In various embodiments, when the processor is implemented using a STM32F412 microprocessor provided by STMicroelectronics, and various MAC operations and libraries are utilized to perform the operations, the response time for each arc fault detection can be as low as about 114 milliseconds. In contrast, when certain other microprocessors without MAC operations are used, the response time for each arc fault detection can be as high as 1 second. Accordingly, depending on the implementation, one or more of the optimizations and/or approximations may be beneficial in reducing the response time of the arc fault detection of the present disclosure.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs)

and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variations. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An arc fault electrical switch apparatus comprising:
   a conductive path;
   a switch configured to selectively interrupt electrical current in the conductive path;
   a current sensor in electrical communication with the conductive path and configured to measure the electrical current to provide current measurements; and
   a controller configured to execute instructions to:
      sample the current measurements to provide current samples;
      compute an estimated signal-to-noise ratio of the electrical current based on at least a portion of the current samples by:
         determining a plurality of signal-to-noise ratio values, wherein each signal-to-noise ratio value is based on a subset of the current samples, and
         selecting a maximum among the plurality of signal-to-noise ratio values as the estimated signal-to-noise ratio;
      determine whether the estimated signal-to-noise ratio is less than a predetermined threshold; and
      activate the switch to interrupt the electrical current in the conductive path, if the estimated signal-to-noise ratio is less than the predetermined threshold.

2. The arc fault electrical switch apparatus of claim 1, wherein the subsets of the current samples correspond to sliding a window over the current samples.

3. The arc fault electrical switch apparatus of claim 1, wherein the controller is further configured to execute the instructions to determine an estimated fundamental frequency value for the electrical current based on a portion of the current samples.

4. The arc fault electrical switch apparatus of claim 3, wherein in determining the estimated fundamental frequency value for the electrical current, the controller is configured to execute the instructions to identify the fundamental frequency value within a frequency band by iteratively narrowing the frequency band.

5. The arc fault electrical switch apparatus of claim 4, wherein in identifying the fundamental frequency value, the controller is configured to execute the instructions to, for each iteration:
   divide the frequency band for that iteration into a first sub-band having a first bandwidth and a second sub-band having a second bandwidth, wherein the first bandwidth and the second bandwidth satisfy a Golden ratio, and a frequency that divides the first sub-band and the second sub-band is denoted as $F_b$;
   select a larger one of the first sub-band or the second sub-band;
   select a frequency $F_d$ in the selected sub-band based on the Golden ratio; and
   narrow one end of the frequency band to one of the frequency $F_b$ or the frequency $F_d$.

6. The arc fault electrical switch apparatus of claim 1, wherein in computing the estimated signal-to-noise ratio of the electrical current, the controller is configured to execute the instructions to compute an estimated signal component of the current samples based on a specific set of harmonics for the signal component and based on a noise component of the current samples being additive white Gaussian noise.

7. The arc fault electrical switch apparatus of claim 6, wherein the specific set of harmonics for the signal component includes odd harmonics and excludes even harmonics.

8. The arc fault electrical switch apparatus of claim 6, wherein the estimated signal component is:

$$s = H(H^T H)^{-1} H^T x,$$

where:
   $x = [x[0] \ldots x[N-1]]^T$ is a vector of the N current samples, $$H = \begin{bmatrix} \cos\left(2\pi \frac{F_0}{F_s}(0)\right) & \ldots & \cos\left(2\pi p \frac{F_0}{F_s}(0)\right) & \sin\left(2\pi \frac{F_0}{F_s}(0)\right) & \ldots & \sin\left(2\pi p \frac{F_0}{F_s}(0)\right) \\ \vdots & \ddots & \vdots & \vdots & \ddots & \vdots \\ \cos\left(2\pi \frac{F_0}{F_s}(N-1)\right) & \ldots & \cos\left(2\pi p \frac{F_0}{F_s}(N-1)\right) & \sin\left(2\pi \frac{F_0}{F_s}(N-1)\right) & \ldots & \sin\left(2\pi p \frac{F_0}{F_s}(N-1)\right) \end{bmatrix},$$

$F_0$ is an estimated fundamental frequency of the electrical current, $F_s$ is a sampling rate of the current samples, and p is a total number of harmonics in the specific set of harmonics.

9. The arc fault electrical switch apparatus of claim 8, wherein $(H^T H)^{-1}$ is approximated as $$\frac{2}{N}.$$

10. The arc fault electrical switch apparatus of claim 8, wherein the noise component of the current samples is x−s.

11. A method of operating an arc fault electrical switch apparatus, the method comprising:

sampling electrical current to provide current samples;

computing an estimated signal-to-noise ratio of the electrical current based on at least a portion of the current samples by:

determining a plurality of signal-to-noise ratio values, wherein each signal-to-noise ratio value is based on a subset of the current samples, and selecting a maximum among the plurality of signal-to-noise ratio values as the estimated signal-to-noise ratio;

determining whether the estimated signal-to-noise ratio is less than a predetermined threshold; and activating a switch to interrupt the electrical current in a conductive path, if the estimated signal-to-noise ratio is less than the predetermined threshold.

12. The method of claim 11, wherein the subsets of the current samples correspond to sliding a window over the current samples.

13. The method of claim 11, further comprising determining an estimated fundamental frequency value for the electrical current based on a portion of the current samples.

14. The method of claim 13, wherein determining the estimated fundamental frequency value for the electrical current includes identifying the fundamental frequency value within a frequency band by iteratively narrowing the frequency band.

15. The method of claim 14, wherein identifying the fundamental frequency value includes, for each iteration:

dividing the frequency band for that iteration into a first sub-band having a first bandwidth and a second sub-band having a second bandwidth, wherein the first bandwidth and the second bandwidth satisfy a Golden ratio, and a frequency that divides the first sub-band and the second sub-band is denoted as $F_b$;

selecting a larger one of the first sub-band or the second sub-band;

selecting a frequency $F_d$ in the selected sub-band based on the Golden ratio; and narrowing one end of the frequency band to one of the frequency $F_b$ or the frequency $F_d$.

16. The method of claim 11, wherein computing the estimated signal-to-noise ratio of the electrical current includes computing an estimated signal component of the current samples based on a specific set of harmonics for the signal component and based on a noise component of the current samples being additive white Gaussian noise.

17. The method of claim 16, wherein the specific set of harmonics for the signal component includes odd harmonics and excludes even harmonics.

18. The method of claim 16, wherein the estimated signal component is:

$$s = H(H^T H)^{-1} H^T x,$$

where:

$x = [x[0] \ldots x[N-1]]^T$ is a vector of the N current samples, $$H = \begin{bmatrix} \cos\left(2\pi\frac{F_0}{F_s}(0)\right) & \cdots & \cos\left(2\pi p\frac{F_0}{F_s}(0)\right) & \sin\left(2\pi\frac{F_0}{F_s}(0)\right) & \cdots & \sin\left(2\pi p\frac{F_0}{F_s}(0)\right) \\ \vdots & \ddots & \vdots & \vdots & \ddots & \vdots \\ \cos\left(2\pi\frac{F_0}{F_s}(N-1)\right) & \cdots & \cos\left(2\pi p\frac{F_0}{F_s}(N-1)\right) & \sin\left(2\pi\frac{F_0}{F_s}(N-1)\right) & \cdots & \sin\left(2\pi p\frac{F_0}{F_s}(N-1)\right) \end{bmatrix},$$

$F_0$ is an estimated fundamental frequency of the electrical current, $F_s$ is a sampling rate of the current samples, and p is a total number of harmonics in the specific set of harmonics.

19. The method of claim 18, wherein $(H^T H)^{-1}$ is approximated as $$\frac{2}{N}.$$

20. The method of claim 18, wherein the noise component of the current samples is x−s.

21. The arc fault electrical switch apparatus of claim 8, wherein the estimated fundamental frequency $F_0$ is a frequency value of $F_0$ which minimizes $-x^T H H^T x$.

22. The method of claim 18, wherein the estimated fundamental frequency $F_0$ is a frequency value of $F_0$ which minimizes $-x^T H H^T x$.

* * * * *